(12) United States Patent
Witriol et al.

(10) Patent No.: US 12,294,919 B2
(45) Date of Patent: May 6, 2025

(54) FLEXIBLE INTERFACE DRIVER COMMUNICATION SYSTEM

(71) Applicant: Lytx, Inc., San Diego, CA (US)

(72) Inventors: Daniel Witriol, Kirkland, WA (US); Daniel Lambert, Carlsbad, CA (US)

(73) Assignee: Lytx, Inc., San Diego, CA (US)

( * ) Notice: Subject to any disclaimer, the term of this patent is extended or adjusted under 35 U.S.C. 154(b) by 711 days.

(21) Appl. No.: 17/489,524

(22) Filed: Sep. 29, 2021

(65) Prior Publication Data

US 2023/0094861 A1    Mar. 30, 2023

(51) Int. Cl.
H04W 4/12 (2009.01)
B60W 40/08 (2012.01)
G06V 20/59 (2022.01)
G06V 40/10 (2022.01)
G06V 40/20 (2022.01)
G10L 15/26 (2006.01)
H04L 51/046 (2022.01)
H04L 51/10 (2022.01)
H04W 4/46 (2018.01)

(52) U.S. Cl.
CPC .............. H04W 4/12 (2013.01); B60W 40/08 (2013.01); G06V 20/59 (2022.01); G06V 40/113 (2022.01); G06V 40/28 (2022.01); G10L 15/26 (2013.01); H04L 51/046 (2013.01); H04L 51/10 (2013.01); H04W 4/46 (2018.02); B60W 2540/223 (2020.02); B60W 2556/65 (2020.02)

(58) Field of Classification Search
CPC ........... H04W 4/12; H04W 4/46; H04W 4/06; B60W 40/08; B60W 2540/223; B60W 2556/65; G06V 20/59; G06V 40/113; G06V 40/28; G10L 15/26; H04L 51/046; H04L 51/10
See application file for complete search history.

(56) References Cited

U.S. PATENT DOCUMENTS

| | | | | |
|---|---|---|---|---|
| 11,260,874 B2 * | 3/2022 | Masuo | ................ | G07C 5/0825 |
| 2021/0304617 A1 * | 9/2021 | Ahire | .................... | G06V 40/20 |
| 2021/0334562 A1 * | 10/2021 | Park | ...................... | B60R 21/015 |

* cited by examiner

Primary Examiner — Kabir A Timory
(74) Attorney, Agent, or Firm — Van Pelt, Yi & James LLP

(57) ABSTRACT

A system includes an interface and a processor. The interface is configured to receive one or more images of an interior of a vehicle from a camera. The processor is configured to determine whether the one or more images indicates to initiate communication to a selected group of receivers from a driver; receive a message; and provide the message to the selected group of receivers.

20 Claims, 11 Drawing Sheets

FLEXIBLE INTERFACE DRIVER COMMUNICATION SYSTEM

BACKGROUND OF THE INVENTION

Modern transportation vehicles often include a variety of digital communication tools ranging from smart phones to high tech console devices, yet for professional drivers the decades-old citizens band (CB) radio is still used because of the simplicity of the push-to-talk of CB radio. Because of the inherent dangers of distracted driving, many smart phone manufacturers prevent users from interacting with their phones while driving and many states have enacted laws discouraging the use of smart phones while driving. However, communication is critical in any work place environment and the complexity of interacting with modern communication devices poses a problem for professional drivers who need the ability to combine the myriad powerful features of modern communications technology with the simplicity and safety of CB Radio.

BRIEF DESCRIPTION OF THE DRAWINGS

Various embodiments of the invention are disclosed in the following detailed description and the accompanying drawings.

DETAILED DESCRIPTION

Figure 1:
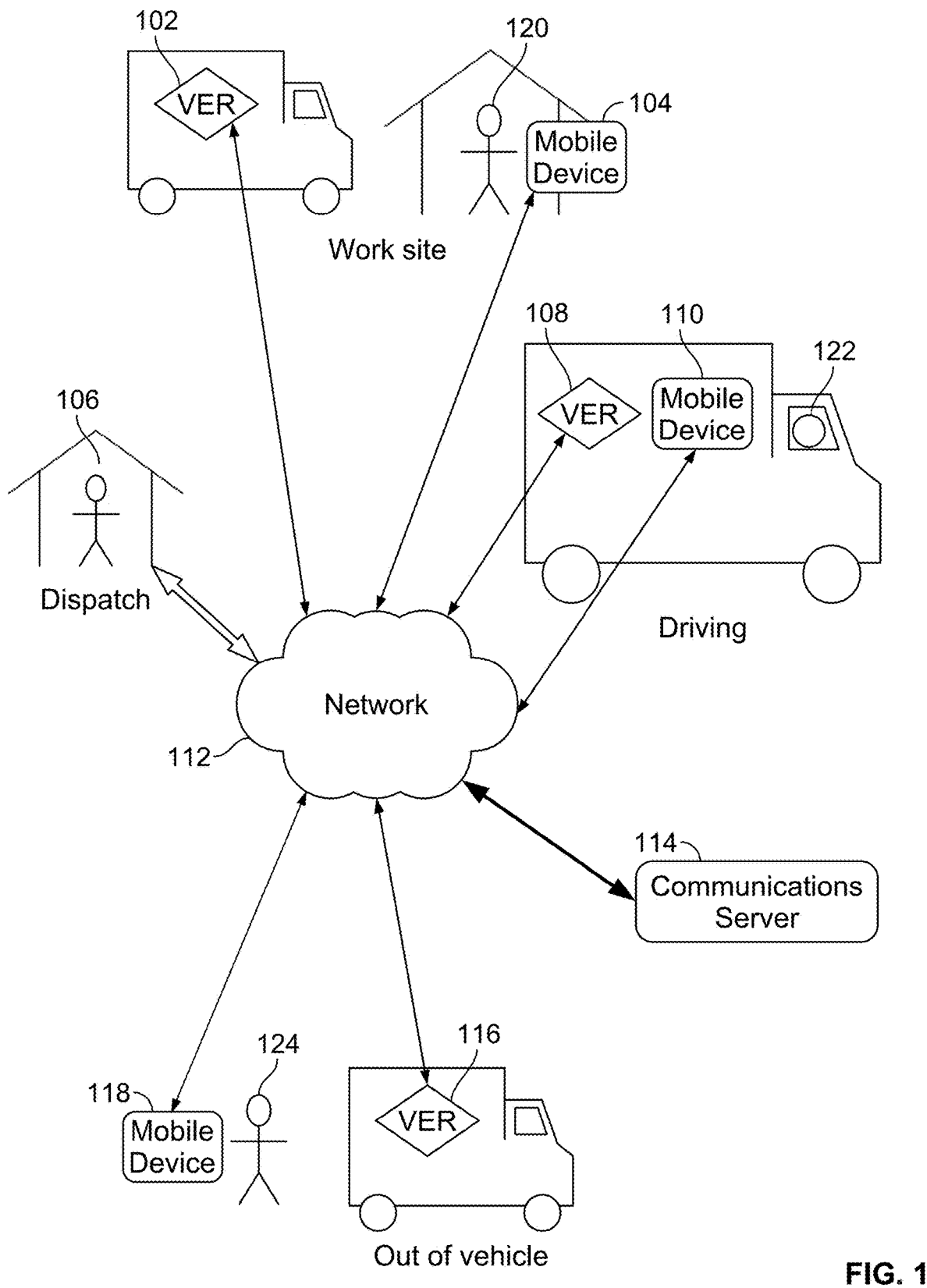
FIG. 1 is a block diagram illustrating an embodiment of a flexible interface driver communication system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A flexible interface driver communication system comprising an interface and a processor is disclosed. The interface is configured to receive one or more images of an interior of a vehicle from a camera. The processor is configured to determine whether the one or more images indicates to initiate communication to a selected group of receivers from a driver, receive a message, and provide the message to the selected group of receivers. In some embodiments, the camera comprises an interior vehicle camera. In some embodiments, the camera comprises an interior vehicle event recorder camera. In various embodiments, the camera comprises one or more of: a camera of a mobile phone, a tablet, an interior vehicle camera, an interior vehicle event recorder, or any other appropriate device.

The majority of professional drivers still use the decades-old citizens band (CB) radio because it is more dangerous to interact with a cell phone or high-tech console device than the simplicity of the push-to-talk of CB radio. For example, modern communication devices such as cell phones or high-tech console devices are difficult for drivers to use as in-vehicle communication devices because they require the user to look at a screen, read text, or poke little virtual buttons. These activities are both distracting and unsafe. In comparison, CB radios are simple and can be used without looking at the device so the driver's focus stays on the road. However, CB radios also have a number of limitations including a limited transmission range and difficulties in determining the most useful channel. CB communication devices also do not benefit from modern digital communication technology—for example, there's no archive or shared repository of any of the safety alerts that people share, there is no flexibility in communication groups (only fixed channels), there is no message translation capability, etc.

In some embodiments, the system includes the best features of modern internet-connected ubiquitous communication devices like smart phones or vehicle event recorders with internal facing cameras combined with the best features of a simple distraction free push-to-talk system like CB radio to enable a powerful, safe, and convenient communication system for professional drivers. For example, a digital communication system has access to detailed positional data, so the system can recreate a 'nearby drivers' connection—or more complicated groups such as drivers on the same road that they are on—or headed in the same direction.

Because the flexible interface driver communication system range is not impacted by mountains and valleys, drivers can just as easily talk to someone at their home base 2,000 miles away as they can the driver next to them. The flexible interface driver communication system can also convert speech to text in real time so the system can build up a database of all the safety messages sent and use these to automatically alert other drivers or enable a fleet operator to text search the communication of their drivers when relevant events occur.

In some embodiments, the system also enables a driver to interact visually with the communication system—for example, the driver uses hand gestures derived from the American Sign Language (ASL) numbers and alphabet. These gestures are captured by an interior-facing camera and recognized by a computer algorithm (e.g., a model, a machine learning model, etc.). In some embodiments, the camera comprises an interior vehicle camera (e.g., a vehicle camera that faces the interior of the vehicle). In some embodiments, the camera comprises an interior vehicle event recorder camera. In various embodiments, the camera comprises a camera of a mobile phone, a tablet, or any other appropriate device.

In some embodiments, the ASL sign for the number 'two' indicates to the system to switch to communications on channel 2 which is a channel for a group of drivers that have been determined to be nearby. The driver can then use a hand gesture (e.g., ASL sign for the number 5) to indicate that the system should initiate communication to a selected group of receivers (e.g., nearby drivers). The driver then speaks a message to be sent to the selected group and ends the message with an end-message gesture (e.g., closed fist or ASL sign for the letter s'). The communication system then receives the message and provides the message to the selected group of receivers (e.g. nearby drivers). In various embodiments, the one or more images include(s) a hand sign to send a message (e.g., a thumbs up to send a message of all is ok, a thumbs down to send a message of all is not ok, a gesture to send a message indicating to start communication, a gesture to send a message to stop communication, etc.). In some embodiments, the one or more images include a hand sign indicating the selected group for communication. In some embodiments, the hand sign indicating the selected group for communication comprises a hand sign for a numerical digit. In various embodiments, the selected group comprises a preselected group of drivers (e.g., a work team, a work sub-group, a fleet member, a friend group, a team work group, a dispatcher, emergency services including police, fire, 911 access, etc.), a derived group of drivers (e.g., a group of drivers ahead on the current road, a group of drivers behind on the current road, a group of drivers within a radius distance from the driver, a group of drivers within a time of arrival from the driver, a group of drivers within a distance of the driver on the road (ahead or behind), etc.), or any other appropriate group. In some embodiments, the derived group of drivers is determined by examining the current driver's location including current road traveling on, other drivers' locations including current road(s) traveling on, determining distances or driving times between the current driver's location and the other drivers' locations, and determining a set of group drivers that satisfy the group criteria (e.g., on the same road, ahead on the road, behind on the road, within a distance, within a driving time, a member of the same company, a member of a work team, a member of a work sub-group, a member of the fleet, a dispatcher, etc.).

In some embodiments, the system enables context aware communication with a driver—for example, when the driver leaves the vehicle (e.g., the driver location and the vehicle location become separated from each other), communications follow the driver out of the vehicle to a portable device instead of a vehicle bound device. As another example, the mode of communication switches to silent mode upon leaving a vehicle (e.g., no verbal communication, switch incoming voice messages to text, symbolic, or other visual messaging, etc.). In some embodiments, when an environment is too noisy only gesture messages are allowed as input or only text messages are allowed as input/output for a device.

The system improves a computer system by contextualizing the interface from a user (e.g., a driver, dispatcher, etc.) to create a safer and easier to use communication system. A driver is enabled to utilize the system for communication in and out of a vehicle and the system transitions interactive modes based on the driver context.

FIG. 1 is a block diagram illustrating an embodiment of a flexible interface driver communication system. In the example shown, driver 120, driver 122, driver 124 and dispatch 106 communicate with each other through communication server 114 and network 112. For example, driver 120 is in a work site context and communicating with the flexible interface driver communication system via mobile device 104, driver 122 is in a driving context and communicating via vehicle event recorder (VER) 108, and driver 124 is in a context out of vehicle and communicating via mobile device 118.

The flexible interface driver communication system supports multiple communication devices such as VERs, phones, computer work stations, work tablets, smart watch, etc. For example, dispatch 106 is in an office context using a computer work station, driver 122 can use either VER 108 or mobile device 110 to communicate, and driver 120 and driver 124, while currently using their mobile device (e.g., mobile device 104 and mobile device 108, respectively), can return to the vehicle and seamlessly transition to VER 102 and VER 116 respectively to continue communication.

In some embodiments, driver 122 is interacting with the flexible interface driver communication system using gestures that are detected by VER 108 to select previously assigned communication channels. These gestures are captured by an interior-facing camera and recognized by a computer algorithm. Clear communication is critical in any work place environment. However, for professional drivers, it can be difficult to interact with modern communication devices such as cell phones in a way that is compatible with safe driving practices. In some embodiments, interacting with the flexible interface driver communication system using gestures provides a way to initiate communication while minimizing driver distraction. For example, to switch channels while paying attention to the road, the driver makes the ASL sign for the number 'one' and the system responds with the audio confirmation "Channel one selected, fleet manager". Or as another example, the driver makes the ASL sign for the number 'two' and the system responds with the audio confirmation "Channel 2 selected, nearby drivers". Or as another example, the driver makes the ASL sign for the number 'three' and the system responds with the audio confirmation "Channel 3 selected, emergency services". In some embodiments, the driver can initiate sending a message on a channel by making the ASL sign for the number five (open hand) and the system responds with the audio confirmation 'talking.' The driver then speaks their message and closes the message with the ASL sign for the letter 'S'

(closed fist) and the system responds with the audio confirmation 'over.' In some embodiments, the driver raises a hand to speak, then lowers the hand when done speaking. In some embodiments, after voice messaging is initiated, lowering a hand or closing will stop the messaging. In various embodiments, the message can be stopped or sent on detecting a completion gesture (e.g., by analyzing an image captured by a camera), after a fixed period of time from the start gesture (e.g., N seconds after—for example, N=10), after the device determines that no more speech is being said, or any other appropriate stopping or sending indication. In some embodiments, driver gestures are detected by other communication devices comprising cameras such as a mobile phone or tablet.

In some embodiments, after initiating a message, a user provides a message content to communication server 114 via network 112. The system determines an appropriate mode for delivering the message content and to whom the content is to be delivered (e.g., according to a channel selection). In some embodiments, the system automatically switches from voice to text or text to voice based on the context of the user. For example, a voice message sent from a person in a vehicle can be converted and delivered as a text message to a person on-site using a mobile device. Similarly, a text message from a person on-site can be converted to a voice message when delivered to someone in the vehicle. In some embodiments, switching between voice and text is determined by whether the phone is actively being used or inactive (e.g., in a pocket). In various embodiments, the mode comprises an audio mode, a text mode, a visual mode, a haptic mode, or any other appropriate mode. In some embodiments, the system translates/transforms the input form of the message to the appropriate output mode. In some embodiments, the system further determines whether the delivery is to be guided towards an appropriate device based on the context (e.g., a mobile device vs. a VER depending on whether a driver is in a vehicle or out of the vehicle).

In some embodiments, all messages are converted to text and stored with location (e.g., global position system (GPS) position) and time stamps so that a full log and record of messages can be searched at a later time or relayed automatically to appropriate recipients. For example, if a road hazard was identified by one driver, the hazard can automatically be relayed to drivers traveling behind as they approach those local hazards for an appropriate period of time (e.g., 20 minutes later, 1 day later, etc.). Similarly, messages can be sent over much broader ranges. For example, if a dispatcher needs to communicate with all of the drivers across a particular state.

Figure 2:
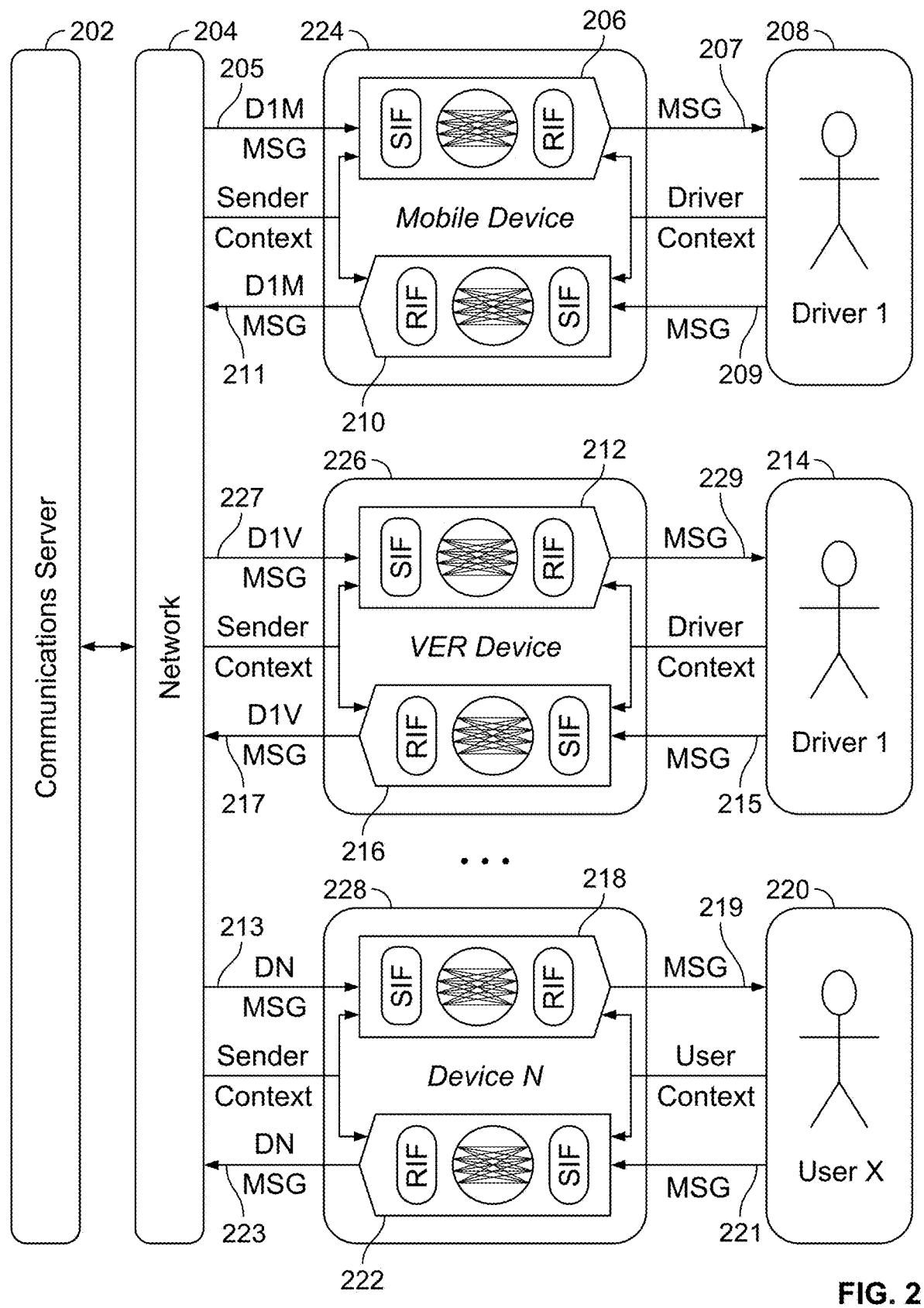
FIG. 2 is a block diagram illustrating an embodiment of a flexible interface driver communication system.

FIG. 2 is a block diagram illustrating an embodiment of a flexible interface driver communication system. In some embodiments, communications server 202 of FIG. 2 is used to implement communications server 114 of FIG. 1. In some embodiments, network 204 of FIG. 2 is used to implement network 112 of FIG. 1. In the example shown, driver 208 uses mobile device 224 to send message (MSG) 209 through context-aware message translator 210. In some embodiments, there is only one context-aware message translator for transmission, one context-aware message translator for receiving, one context-aware message translator in the communications server, or in any other appropriate portion of the system. Network 204 receives output (D1M MSG) 211 of context-aware message translator 210 containing the message in the receiver's preferred modality (e.g., an audio mode, a text mode, a visual mode, a haptic mode, or any other appropriate mode version of MSG 209) and passes it to communications server 202 for processing and routing to a specified group of receivers. In some embodiments, D1M MSG 211 is translated to text and archived on communications server 202. In some embodiments, server 202 provides mode translation before routing it to the receiver(s) if the receiving or sending device does not have the appropriate mode translation technology available (not shown in FIG. 2). For example, driver 208 is in a work site context (e.g., driver context is a work site context) and sends a text message (e.g., MSG 209) using mobile device 224 to dispatch (e.g., user X 220) at device N 228. Dispatch receives the message via network 204 (e.g., as DN MSG 213) as audio after being processed by communications server 202 and translated by context-aware message translator 210 from text to speech (e.g., as indicated via sender context as the preferred receiving mode) to become D1M 211, which is passed via network 204 to communications server 202 to be routed to device N 228 via network 204). D1M 211 is passed through as speech by message translator 218 to be delivered as MSG 219 to dispatch (e.g., user X 220) as indicated by sender context and user context input to device N 228. In response, dispatch (e.g., user X 220) sends a spoken message (e.g., MSG 221) to a specified group of drivers that includes driver 208 using communications server 202 and network 204. Driver 208 is in a work site context and receives dispatch's spoken message as text (the preferred receiver's modality) after being translated by context-aware message translator 210 from speech to text (e.g., passing through message translator 222 to become DN MSG 223 and relayed by network 204 to communications server 202, which forwards to the specified group including sending the message via network 204 to driver 208 as D1M 205 and translated from speech to text by message translator 206 and sent as MSG 207 to driver 208).

Or as another example, driver 214 is in a driving context and is interacting with the flexible interface driver communication system using gestures that are detected by VER 226 to select a previously assigned communication channel for dispatch. These gestures are captured by an interior-facing camera and recognized by a computer algorithm. Driver 214 then initiates sending a message on the channel by making the ASL sign for the number five (open hand) and the system responds with the audio confirmation 'talking.' The driver then speaks message MSG 215 and closes the message with the ASL sign for the letter 'S' (closed fist) and the system responds with the audio confirmation 'over'. Dispatch (e.g., user X 220) receives message DN MSG 213 via network 204 as text after MSG 215 is translated by context-aware message translator 216 from speech to text into D1V MSG 217 and processed by communications server 202. In response, dispatch sends a text message MSG 221 to a specified group of drivers that includes driver 214 using communications server 202 and network 204. Driver 214 is in a driving context and receives dispatch's text message D1V MSG 227 as audio (the preferred receiver's modality) after being translated by context-aware message translator 212 from text to speech MSG 229.

In some embodiments, all messages from a transmitting user are converted to text at a transmitting user device (e.g., using message translator 210 of mobile device 224, using message translator 216 of VER device 226, using message translator 222 of device N 228, etc.) for archiving and search at the communication server and then translated to appropriate output format for a receiving user at a receiving user's device (e.g., using message translator 206 of mobile device 224, using message translator 212 of VER device 226, using message translator 218 of device N 228, etc.).

In some embodiments, a user's device knows its own context but other devices do not know the user's device's context. As an example, user 208 sends a message to user 220. User device 224 knows the context of user 208 context but not the context of user 220 or device 228. In some embodiments, the sender sends a package that includes both the voice message and a text transcription of the voice message to the receiver. The receiver decides the manner in which it will present the message to its user. In various embodiments, a receiver presents the message as text, as voice, as text and voice, or any other appropriate manner.

In some embodiments, the sender does not have the technology onboard to perform speech to text translation and, in that case, the server provides a translation and adds the translation to a package before routing the message package to the receiver(s). In some embodiments, the message is only initially provided as text, and in these cases either the receiver provides a text to speech translation or the server provides a translation before sending it to the receiver in case the receiver is not capable of text to speech.

Figure 3:
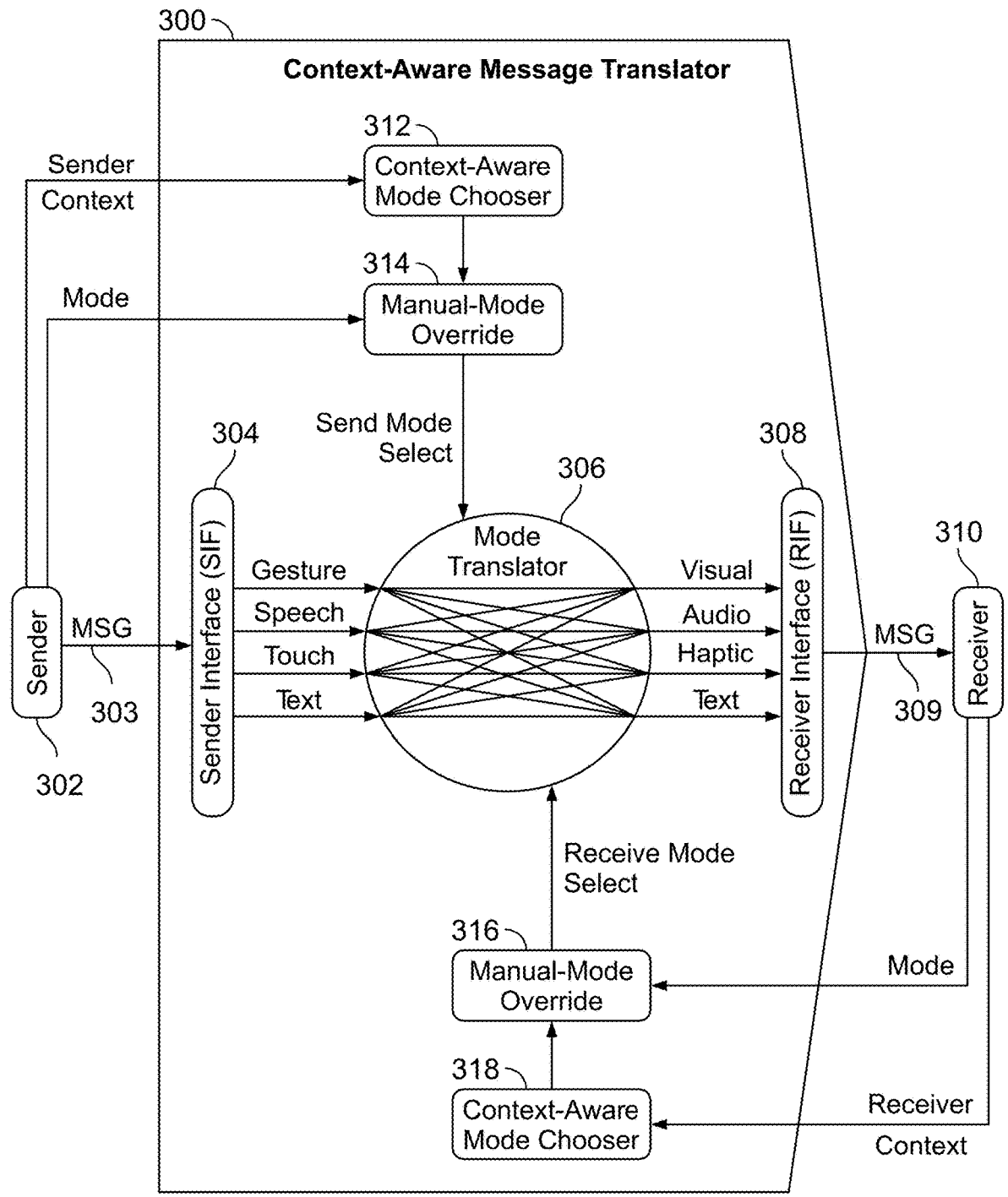
FIG. 3 is a block diagram illustrating an embodiment of a context-aware message translator.

FIG. 3 is a block diagram illustrating an embodiment of a context-aware message translator. In some embodiments, context-aware message translator 300 of FIG. 3 is used to implement context-aware message translator 206, 210, 212, 216, 218 and 222 of FIG. 2. In the example shown, sender 302 transmits a message (MSG 303) to sender interface (SIF) 304. In various embodiments, the mode of MSG 303 comprises a gesture mode, a speech mode, a touch mode, a text mode, or any other appropriate mode. Sender interface (SIF) 304 transmits MSG 303 to mode translator 306. Mode translator 306 translates the sender-specified-mode message from sender 302 into a message with a mode specified by the receiver. In various embodiments, the receiver's mode comprises a visual mode, an audio mode, a haptic mode, text mode, or any other appropriate mode. Mode translator 306 transmits the translated message to receiver interface (RIF) 308. Receiver interface (RIF) 308 transmits MSG 309 to receiver 310.

In some embodiments, context-aware mode chooser 318 determines an appropriate mode for delivering the message content to receiver 310 based on the receiver context and available receiver devices. For example, dispatch sends a text message to a driver who is currently driving. Context-aware mode chooser 318 receives driver context information that driver is driving (and cannot safely read texts) and instructs mode translator 306 to translate dispatch's text message from text into speech and present the audio version of the message to the driver. In some embodiments, receiver 310 manually overrides the context-aware mode chooser's message mode choice using manual-mode override 316 and specifies a preferred mode. For example, dispatch sends a text message to receiver 310 who is currently driving but has specified the preferred receiving mode as text using manual-mode override 316. In some embodiments, receiver interface 308 further determines whether the delivery is to be guided towards an appropriate device based on the context (e.g., a mobile device vs. a VER depending on whether a driver is in a vehicle or out of the vehicle).

In some embodiments, mode translator 306 receives input from manual-mode override 314 or from context-aware mode chooser 312. In some embodiments, context-aware mode chooser 312 receives sender context information from sender 302 to determine a translation operation desired from sender 302 or based on sender context for MSG 303. In some embodiments, sender 302 is able to override a context derived state for mode translator 306.

In some embodiments, a sender sends as much data as it has (e.g., a voice version of a message, a text version of a message, a video version of a message, etc.) and performs translation(s) and/or transformation(s) as possible. In some embodiments, the sender sends only an inputted version of a message and the server or the receiver performs appropriate translation(s) and/or transformation(s) of the message to different modes (e.g., voice, text, video, etc.). In some embodiments, the server performs neither translation nor transformation and the sender system and the receiver system are both able to perform translation and/or transformation. In some embodiments, the sender system and the receiver system perform neither translation nor transformation and the server is able to perform translation and/or transformation. In various embodiments, the server, the sender system, and/or the receiver system are able to perform translation and/or transformation in any other appropriate permutation or combination.

Figure 4:
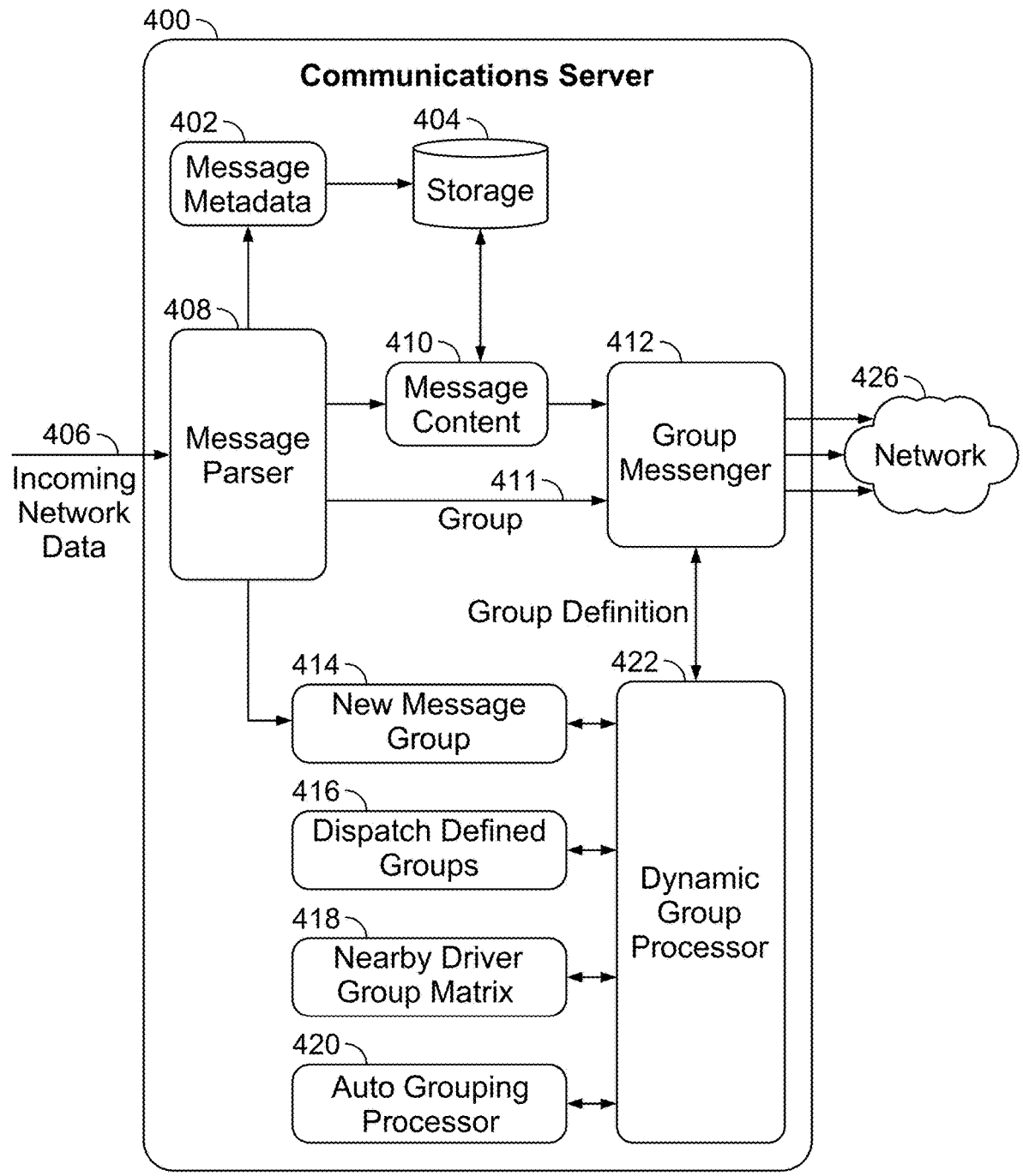
FIG. 4 is a block diagram illustrating an embodiment of a communications server.

FIG. 4 is a block diagram illustrating an embodiment of a communications server. In some embodiments, communications server 400 of FIG. 4 is used to implement communications server 114 of FIG. 1 and communications server 202 of FIG. 2. In the example shown, message parser 408 receives incoming network data 406 (e.g., an incoming message, message metadata, and receiver group data from network). Message parser 408 parses incoming network data 406 and sends message content 410 to storage 404 and group messenger 412. Message parser 408 parses incoming network data 406 and sends message metadata 402 to storage 404. If the receiver message group is a predefined group, message parser 408 parses incoming network data 406 and sends receiver group 411 to group messenger 412. If the receiver message group comprises a new group definition, message parser 408 parses incoming network data 406 and sends new group definition to new message group 414. Group messenger 412 receives message content 410 and group 411 to which the message is to be sent. Group messenger 412 requests group definitions from dynamic group processor 422 and sends message content 410 to group recipients via network 426. Dynamic group processor 422 serves group definitions to group messenger 412 based on input from new message group 414, dispatch-defined groups 416, nearby driver group matrix 418, and one or more auto grouping processor(s) 420.

In some embodiments, when a user of a client device activates/joins a group it does so by telling the server that it is now in the group. The server then knows that when sends a message to the group, it should include this client device. If the client device is not joined to the group it is not going to get the message.

In some embodiments, nearby driver group matrix 418 and/or dynamic group processor 422 determines groups for receiving messages by determining positions for users that are nearby—for example, users that have a location within a radius from a transmitting user, users that have a location within a time to drive to reach a transmitting user, users that are ahead of the transmitting user along the same road that the transmitting user is driving on, users that are behind the transmitting user along the same road that the transmitting user is driving on, users that are within a distance ahead or behind on the same road that the transmitting user is driving on, etc. and determines a group based on those positions.

In some embodiments, dispatch defined groups 416 and/or dynamic group processor 422 determines groups for receiving messages by determining users associated with lists—for example, drivers in a work group, drivers in a shift, drivers in subgroup, drivers in the fleet, drivers with a same specialty, drivers on call, drivers with a set of skills, etc. and these are used to determine a receiving group of users for a message.

In some embodiments, a given user has a predefined set of groups that map to a given hand gesture. In some embodiments, the given user defines the set of groups at the user's discretion—for example, when the given user starts his route.

For example, a driver sends a message that is received as incoming network data 406 at communications server 400. The message is parsed by message parser 408 to be sent to the intended receiver (e.g., dispatch). Message parser 408 extracts message metadata and sends to message metadata 402 and stored in storage 404. Message parser 408 extracts message content 410 and relays to group messenger 412. Message parser 408 sends group 411 information to group messenger 412 to output message to a receiver via network 426. For example, the driver sends the message to dispatch that they will be delayed to a job site because of a road hazard (e.g. a boulder in the road). Dispatch then sends a message to warn all drivers near the reporting driver about the road hazard using dynamic group processor 422 which receives group definitions from the dynamically defined nearby driver group matrix 418. In some embodiments, the warning provided to a driver is persisted in a storage device (e.g., for re-warning a driver or maintaining a warning for the driver) and then later deleted or indicated as inactive after a time period. The server will continue to send messages to drivers as they approach this area for a given period of time or until the hazard is removed. Or as another example, one or more auto grouping processor(s) 420 is set to monitor a state's department of transportation (DOT) warnings (e.g., an area of construction or high wind conditions) or derive warnings or hazards from an external company database (e.g., a crash ahead, erratic driver or other automatically identified condition) and automatically create groups that are affected by these warnings so that dispatch or other drivers can easily communicate with those affected drivers.

In some embodiments, a user dynamically creates private groups. For example, a fleet manager needs to talk directly with a driver or with a set of drivers (e.g. they have a new job for a customer and need to find a driver nearby who can do it). To create a group, the fleet manager selects one or more drivers from a map of drivers connected to a group and a private channel is opened with just those drivers. The selected drivers are automatically switched to the private group and receive a voice message to that effect (e.g. "Entering private group with Fleet Manager"). The fleet manager can talk to all of the drivers simultaneously and replies from the drivers automatically go to this newly created private group. The fleet manager can terminate the group whenever they want and the drivers are returned to the group they were last in. Drivers can also exit the group using hand gestures by selecting a new group.

In some embodiments, the groups are tied to named channels (e.g., channel 1, channel 2, etc.). In some embodiments, the groups are tied to a channel or group identifier. In some embodiments, a user can indicate being able to access a group. In various embodiments, user access to a given group is determined using a registry, a list, a client role list, a client access rights list, or any other appropriate access mechanism.

In some embodiments, when a message is sent an indication is included that indicates the one or more groups that the message is to be sent to.

In some embodiments, groups are dynamic. For example, a 'nearby same road drivers' group is like any other, but may have a property applied to it that causes the server to filter messages to receivers based on their distance from the sender. That is to say, assuming client A and client B, when client A sends a message to the "nearby same road drivers" group and client B and client C are joined to the "nearby same road drivers" group. The property set on this group indicates that drivers must be on the same road and within 1,000 meters of each other. Before routing the message from Client A to Client B, the server checks the location from which Client A is sending the message, and checks the last reported location of Client B. If they are both on the same road and within 1,000 meters of each other, the system forwards the message to Client B, if not it just moves on. Next it looks at Client C and does the same comparison. It may end up sending the message to both Client B and Client C, just Client C, or neither depending on their location. There could be multiple groups with this type of behavior, with different names/IDs e.g., one for each company.

In various embodiments, a group comprises one or more of: a distance radius nearby group (e.g., a receiver is within a physical distance of a driver or sender), a time radius nearby group (e.g., a receiver is within a driving time distance of a driver or sender), a distance along road nearby group (e.g., a receiver is within a physical distance of a driver or sender along the same road the driver is traveling on)), a same direction travel nearby group a distance away along the same road (e.g., a receiver is within a physical distance of a driver or sender traveling along the same road the driver is traveling on and in the same direction), a same direction travel nearby group ahead along the same road (e.g., a receiver is within a physical distance of a driver or sender traveling along the same road the driver is traveling on and in the same direction and ahead of the driver on the road), a same direction travel nearby group behind along the same road (e.g., a receiver is within a physical distance of a driver or sender traveling along the same road the driver is traveling on and in the same direction and behind the driver on the road), or any other appropriate group.

In some embodiments, a user is joined to a single group at a time. In some embodiments, a single group is active and no groups are in the background. For example, a user gesture indicates a number 1 so that group 1 is joined, and at a later time a user gesture indicates a number 2 and the system has the user leave or inactivate group 1 and the join or activate group 2.

In some embodiments, a user is joined to one active group and multiple background groups. For example, a user gesture indicates a number 1 and the user joins group 1 with group 1 as the active group, then a user gesture indicates a number 2 and the user joins group 2 with group 2 as the active group and group 1 switched to being a background group. Background group messages are received at a receiver but presented or not as a background messages (e.g., a background message is set by preferences to be only stored for replay, only displayed as texts, stored and replayed as audio when making the background group the active group, only played as audio if the active channel is not currently playing a message audio, etc.) In some embodiments, the user preferences indicate a preferred channel that is defaulted to be active.

In some embodiments, a user is joined to a set of active groups and/or zero or more background groups. For example, a dispatcher is active on multiple channels and hearing messages from multiple groups at the same time (e.g., group 1, group 2, etc.). When a user responds to a message, it automatically responds only to the group that the message came from. In this scenario, a voice prompt does not just say "Talk" it says "Talk to Fleet Manager" (assuming "Fleet Manager" is the name of the group) that way you know the name of the group you are responding to.

Figure 5:
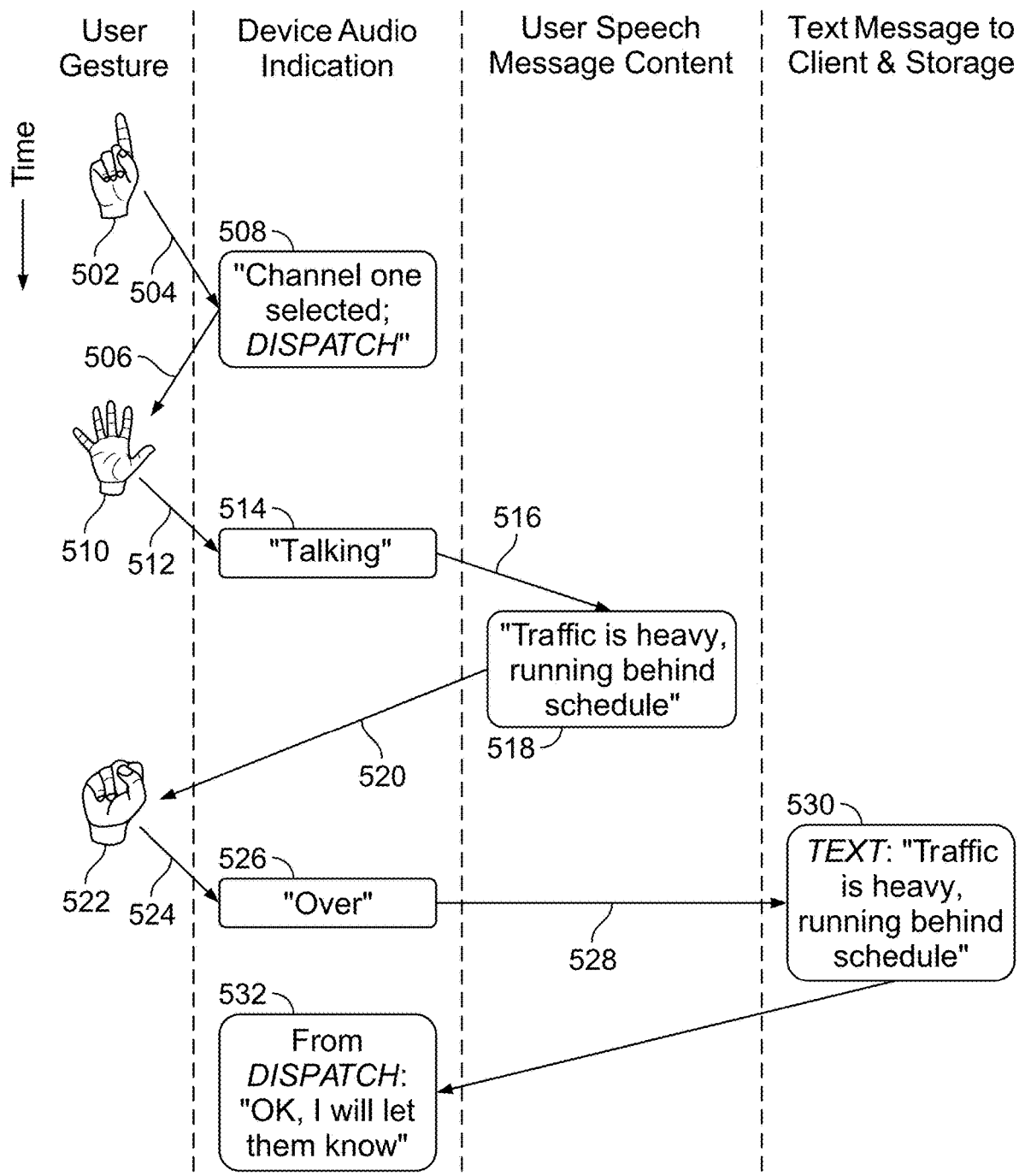
FIG. 5 is a diagram of an example driver multi-modal communication using a flexible interface driver communication system.

FIG. 5 is a diagram of an example driver multi-modal communication using a flexible interface driver communication system. In some embodiments, the sequence of events depicted in FIG. 5 is executed using the flexible driver communication system of FIG. 1. In the example shown, each column of FIG. 5 indicates the modality in use by the user at a particular time. Elapsed time progresses from the top of FIG. 5 to the bottom of FIG. 5. In 502, a driver makes a gesture using the ASL sign for the number 'one.' For example, a driver holds up his or her hand and creates a shape with his or her fingers in front of a camera inside a vehicle. In 504, the gesture is captured by an interior-facing camera and recognized by a computer algorithm. In some embodiments, the ASL sign for the number 'one' is a system command that is sent to communications server requesting to be added to a first group (e.g., a group to communicate on channel one with a dispatcher). In some embodiments, the ASL sign for the number 'two' is a system command that is sent to communications server requesting to be added to a second group (e.g., a group to communicate on channel two with nearby drivers—for example, drivers within a certain distance, drivers within a certain driving time, etc.). In some embodiments, there is a subset of time-sensitive groups that always push messages through to a user (e.g., using intelligent queuing). In some embodiments, the time-sensitive groups handle emergency messages or other urgent messages. In some embodiments, the ASL sign for the number 'three' is a system command that is sent to communications server requesting to be added to a third group (e.g., a group to communicate on channel three with emergency services). In various embodiments, hand signs correspond to groups including a group of drivers ahead on the current travel road or direction, a group of drivers behind on the current travel road or direction, a group of similar trades members, a fleet group, or any other appropriate group. In 508, the system confirms selection command with an audio message. For example, the system creates an audio message for the driver to hear: 'Channel one selected; dispatch.'

In some embodiments, the message comprises one of the following: a voice clip, a video clip, a text converted from a voice data input, or an indicated menu communication. In some embodiments the indicated menu communication comprises one communication of a selectable menu of communications. In some embodiments the indicated menu communication is selected using a voice indication. In some embodiments the indicated menu communication is selected using a sign indication. In some embodiments, a sign indication is pre-trained (e.g., "thumbs up" sign indication="all good", "thumbs down" sign indication="no good", etc.). In some embodiments, the sign indication is customizable where drivers add custom gestures that define shortcuts or short phrases. In some embodiments, a machine learning algorithm is used to train new gestures. In some embodiments the processor is further configured to receive an incoming message, where the incoming message is received at a portable device in response to the driver being outside the vehicle. In some embodiments, the incoming message is translated to text from voice to display to the driver on the portable device.

In some embodiments, a sender sends a message to a driver directly or via a group and the communication server receives an indication that the driver position is different from the position of the driver's vehicle (e.g., the GPS location of a portable device (e.g., a phone or tablet) with the driver is different from a GPS location of a vehicle event recorder in the vehicle), which forwards the message to the portable device with the driver instead of and/or in addition to sending the message to the vehicle event recorder. The message is translated to a selected mode for the driver (e.g., the message is translated by the communication server or the portable device to text so as not to disturb communications between the driver and any people nearby). In some embodiments, the communication server initially sends the message to the vehicle event recorder, but the vehicle event recorder determines using location information that the driver and the vehicle are not located at the same coordinates (e.g., by checking the vehicle location and the portable device location) and sends the message received to the portable device (e.g., and translates/transforms the message content appropriately based on user preference settings—for example, an audio message is translated to a text message). In various embodiments, the transformation/translation of the message is from text to voice (e.g., in case the driver does not have hands available to manipulate the portable device), voice to text (e.g., in case the driver does not want voices disturbing the driver), text or voice to image (e.g., in case the driver wants quick message—yes, no, go ahead, stop, etc.), or any other appropriate transformation/translation.

In 506, the system monitors an interior-facing camera for gestures. For example, the system periodically takes images from the inside camera and monitors and processes them to recognize gestures made by a driver. In some embodiments the images are stored. In some embodiments, the images are not stored. In 510, a driver makes a gesture using the ASL sign for the number 'five.' For example, a driver holds up his or her hand and creates a shape with his or her fingers in front of a camera inside a vehicle. In some embodiments, the ASL sign for the number 'five' indicates that the driver intends to speak a message to be sent to dispatch. In 512, the gesture is captured by an interior-facing camera and recognized by a computer algorithm. In 514, the system confirms the command to initiate communication with the audio message. For example, the system creates an audio message for the driver to hear: 'Talking on channel X.' In 516, the system monitors the microphone for the driver's spoken message. For example, the system turns on an interior microphone and stores/records audio message content. In 518, the driver speaks the message 'Traffic is heavy, running behind schedule.' In 520, the system monitors an interior-facing camera for gestures. In 522, a driver makes a gesture using the ASL sign for the letter 'S' indicating that the driver has ended the message. In 524, the gesture is captured by an interior-facing camera and recognized by a computer algorithm. In 526, the system confirms the command to end communication with the audio message 'Over.' For example, the system turns off an interior microphone and ends storing/recording of audio message content. In 528, the driver's spoken message is converted to text using context-aware message translator. For example, the context aware message translator determines that a dispatcher's preferred or desired mode for receiving a message comprises a text message, so the audio driver message is converted from audio to text and then provided to the dispatcher. In various embodiments, the voice to text conversion is performed at the device in the vehicle with the driver, at the device accompanying the driver (e.g., a mobile phone, a tablet, etc.), at a cloud-based server, at a dispatcher's device (e.g., a personal computer), or using any other appropriate device. In some embodiments, context-aware message translator is context-aware message translator 300 of FIG. 3. In 530, the text message is received by dispatch and stored by communications server for subsequent search or processing. In some embodiments, communications server is communications server 400 of FIG. 4. In 532, dispatch responds to driver's message with 'OK, I will let them know.'

Figure 6:
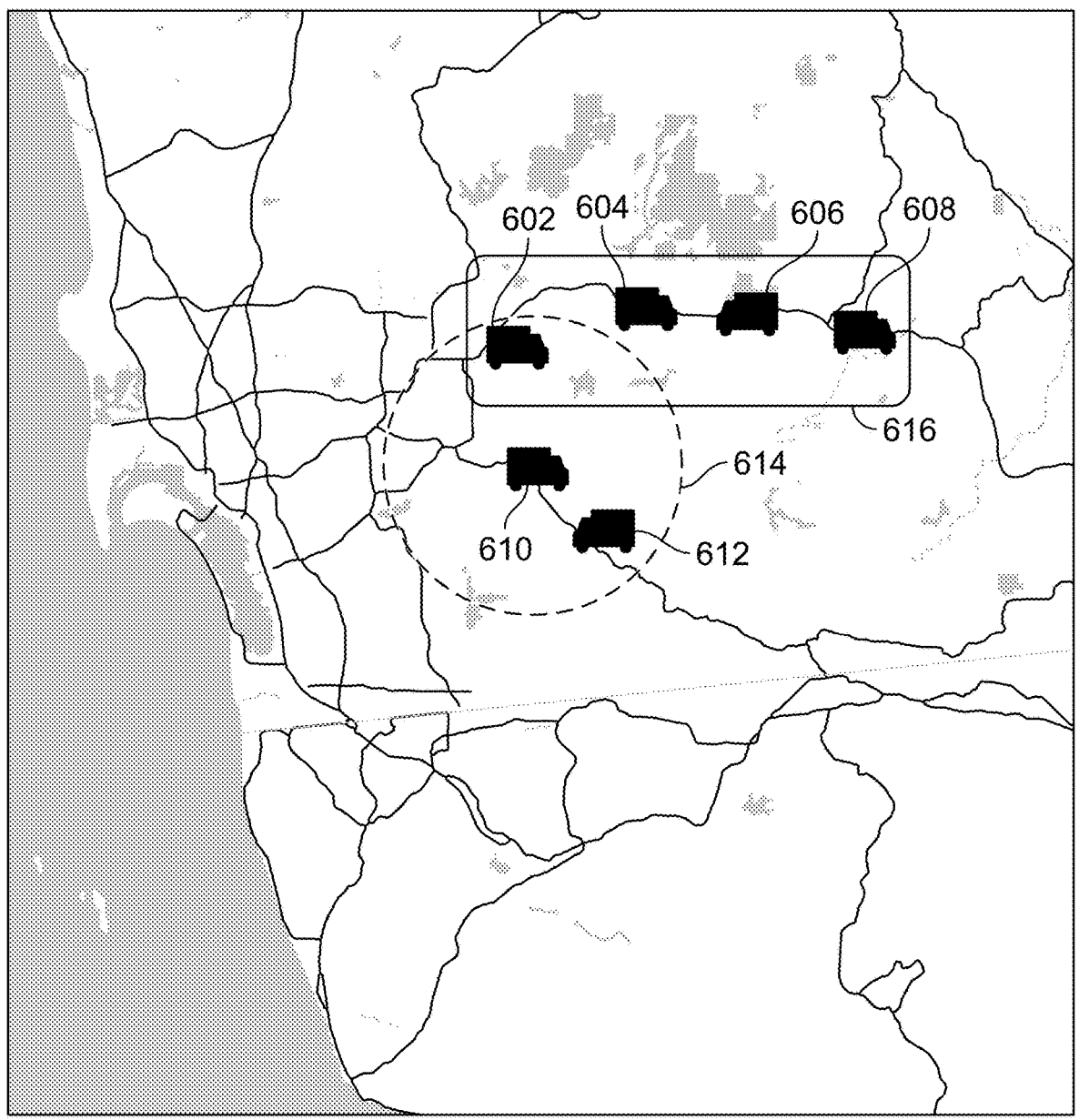
FIG. 6 is a map illustrating an embodiment of various communication groups that can be dynamically defined for use in a flexible interface driver communication system.

FIG. 6 is a map illustrating an embodiment of various communication groups that can be dynamically defined for use in a flexible interface driver communication system. In the example shown, vehicle 602, vehicle 604, vehicle 606, and vehicle 608 are traveling along the same road. Of these four vehicles, vehicle 602, vehicle 604, and vehicle 608 are traveling in the same direction (e.g., east) and vehicle 606 is traveling in the opposite direction (e.g., west). Vehicle 610 and vehicle 612 are traveling on a different road than vehicle 602, vehicle 604, vehicle 606, and vehicle 608.

In some embodiments, a communication server dynamically defines groups of drivers based on vehicle location and direction of travel. In some embodiments, communication server is communication server 400 of FIG. 4, communication server 202 of FIG. 2, and communication server 114 of FIG. 1. For example, rectangle 616 defines a group of vehicles traveling along the same road. Having such a group defined makes it efficient for communicating information relevant to that location-defined group such as sending alerts for a road hazard along that road. As another example, circle 614 defines a group of vehicles within a certain radius of a location. Having such a group defined makes it efficient for communicating information that is relevant to that area such as contacting all drivers that are close to a particular client in that area and as a result could meet them within a short time.

In some embodiments, the selected group comprises the driver and a dispatcher. In some embodiments, the selected group comprises the driver and a set of drivers of vehicles ahead on a road that the driver is traveling along. In some embodiments, the selected group comprises the driver and a set of drivers of vehicles behind on a road that the driver is traveling along. In some embodiments, the selected group comprises the driver and a set of drivers located within a radius of a current position of the driver. In some embodiments, the selected group comprises the driver and a set of drivers located within a time to reach current position by driving. In some embodiments, the selected group comprises the driver and a fleet group, a team work group, or a friend group. In some embodiments, the selected group is a dynamically defined 'customer' group which comprises the driver and the customer to which the driver is headed. For example, the 'customer' group would allow the driver to communicate directly with the customer (e.g., "I'm 5 minutes away," "Where should I park?" etc.). The message is relayed to the customer through the communications server (i.e., via SMS text message, voice message, or 3rd party application).

Figure 7:
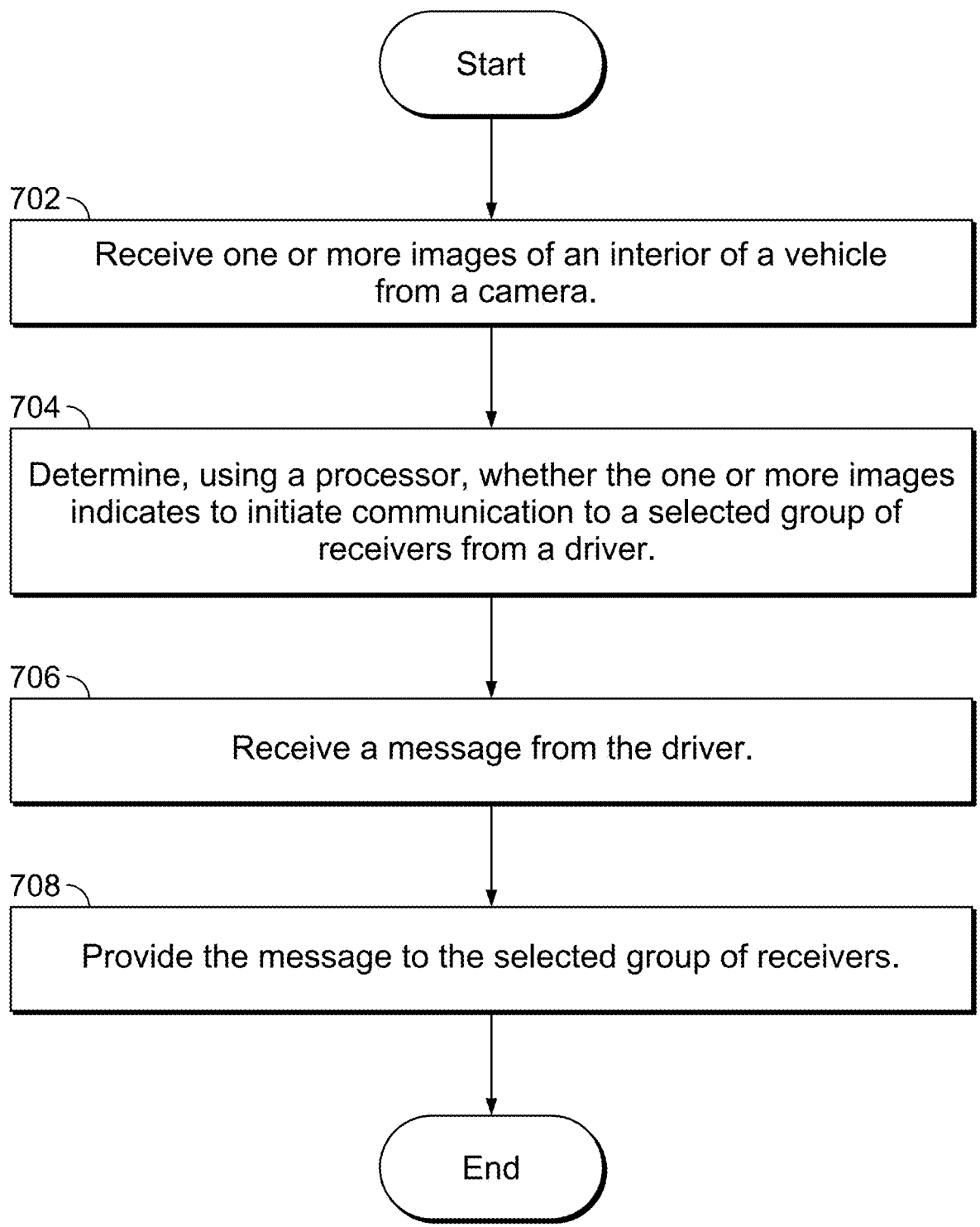
FIG. 7 is a flow diagram illustrating an embodiment of a flexible interface driver communication system.

FIG. 7 is a flow diagram illustrating an embodiment of a flexible interface driver communication system. In some embodiments, the process of FIG. 7 is executed by the flexible interface driver communication system of FIG. 2. In the example shown in 702, one or more images of an interior of a vehicle from a camera is received. For example, a driver interacts with the flexible interface driver communication system using gestures that are detected by a vehicle event recorder (VER) to select previously assigned communication channels or to initiate communication of a message. These gestures are captured by an interior-facing camera on the VER and recognized by a computer algorithm. In some embodiments, driver gestures are detected by other communication devices comprising cameras such as a mobile phone or tablet. In 704, whether the one or more images indicate to initiate communication to a selected group of receivers from a driver determined using a processor. For example, to switch channels while paying attention to the road, the driver makes the ASL sign for the number 'two' and the system responds with the audio confirmation 'Channel 2 selected, nearby drivers'. In some embodiments, the driver can initiate sending a message on a channel by making the ASL sign for the number five (open hand) and the system responds with the audio confirmation 'talking.' The driver then speaks their message and closes the message with the ASL sign for the letter 'S' (closed fist) and the system responds with the audio confirmation 'over'. In 706, the system receives a message from the driver. For example, the driver speaks a message (e.g., the driver speaks a message—for example, 'there is a boulder in the road'). In 708, the message is provided to the selected group of receivers. For example, the message is sent about that road hazard to all nearby drivers in their preferred message modality.

In various embodiments, a gesture using the ASL sign for the number 1 indicates to change to channel 1, a gesture using the ASL sign for the number 2 indicates to change to channel 2, a gesture using the ASL sign for the number 3 indicates to change to channel 3, a gesture using the ASL sign for the number 4 indicates to change to channel 4, a gesture with a thumb held up indicates yes, all good, or 10-4, a gesture with a thumb held down indicates no or not good, a gesture using the ASL for the number 5 indicates to start talking, a gesture using the ASL sign for the letter 's' indicates to end talking, a gesture putting a hand down indicates to end talking, a gesture using the ASL sign for the number 9 indicates to start a system voice command, a gesture using the ASL sign for the letter 's' indicates to end a system voice command, a gesture putting a hand down indicates to end a system command, or any other appropriate gesture indicating a designated command. In some embodiments, system voice commands allow for more complex interactions with the flexible interface driver communication system using a predefined menu of options (e.g., "repeat last message", "mute volume", "start calibration" or "help" to get a list of available commands). In some embodiments, the system command is a short cut for a more complex series of actions. For example, the voice command "I have an emergency" runs multiple commands at once (e.g., the system sends a notification with the driver position to the fleet manager and emergency services, highlights the vehicle on a fleet manager's map, and transfers the driver to the emergency services channel).

In some embodiments, the pinch gesture (e.g. ASL sign for the number 9 or other gestures) can be used to put the system into different modes. These different modes allow simple gestures to be re-used to achieve different results. For example, the ASL sign for the letter 's' indicates to end talking in the talking mode, but in the system volume mode the ASL sign for the letter 's' indicates to set the volume to mute.

Figure 8:
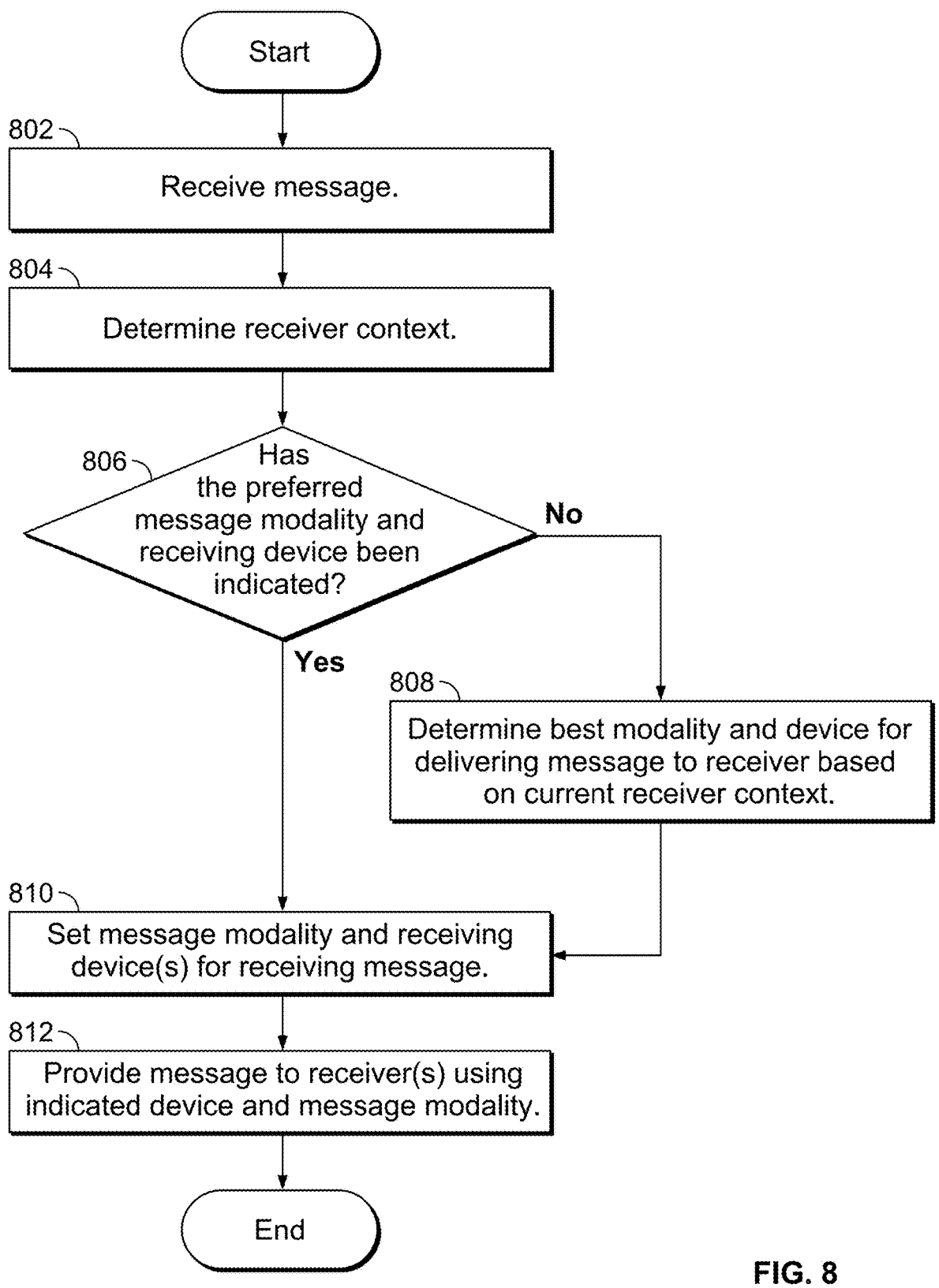
FIG. 8 is a flow diagram illustrating an embodiment of a receiving a message using a flexible interface driver communication system.

FIG. 8 is a flow diagram illustrating an embodiment of a receiving a message using a flexible interface driver communication system. In some embodiments, the process of FIG. 8 is executed by the flexible interface driver communication system of FIG. 2. In the example shown in 802, the receiver receives a message. For example, a message is received at a system for a driver or a dispatcher. In 804, the receiver context is determined. For example, the receiver is a driver that is driving or the receiver is a driver out of the vehicle at a work site. As another example, a dispatcher is the receiver in a quiet room or in a noisy room. In 806, it is determined whether the preferred message modality and receiving device has been indicated. In response to determining that the preferred message modality and receiving device has not been indicated, control passes to 808. In 808, a best modality and device for delivering a message to a receiver based on a current receiver context is determined, and control passes to 810. In response to determining that the preferred message modality and receiving device has been indicated, control passes to 810. In 810, the message modality and receiving device(s) is set for receiving the message. In 812, the message to receiver(s) is provided using indicated device and message modality. For example, if the receiver is a driver that is driving, the message is communicated to the driver using the audio from the VER. Or as another example, if the receiver is a driver at a work site, the message is communicated to the driver using the text from their mobile device.

Figure 9:
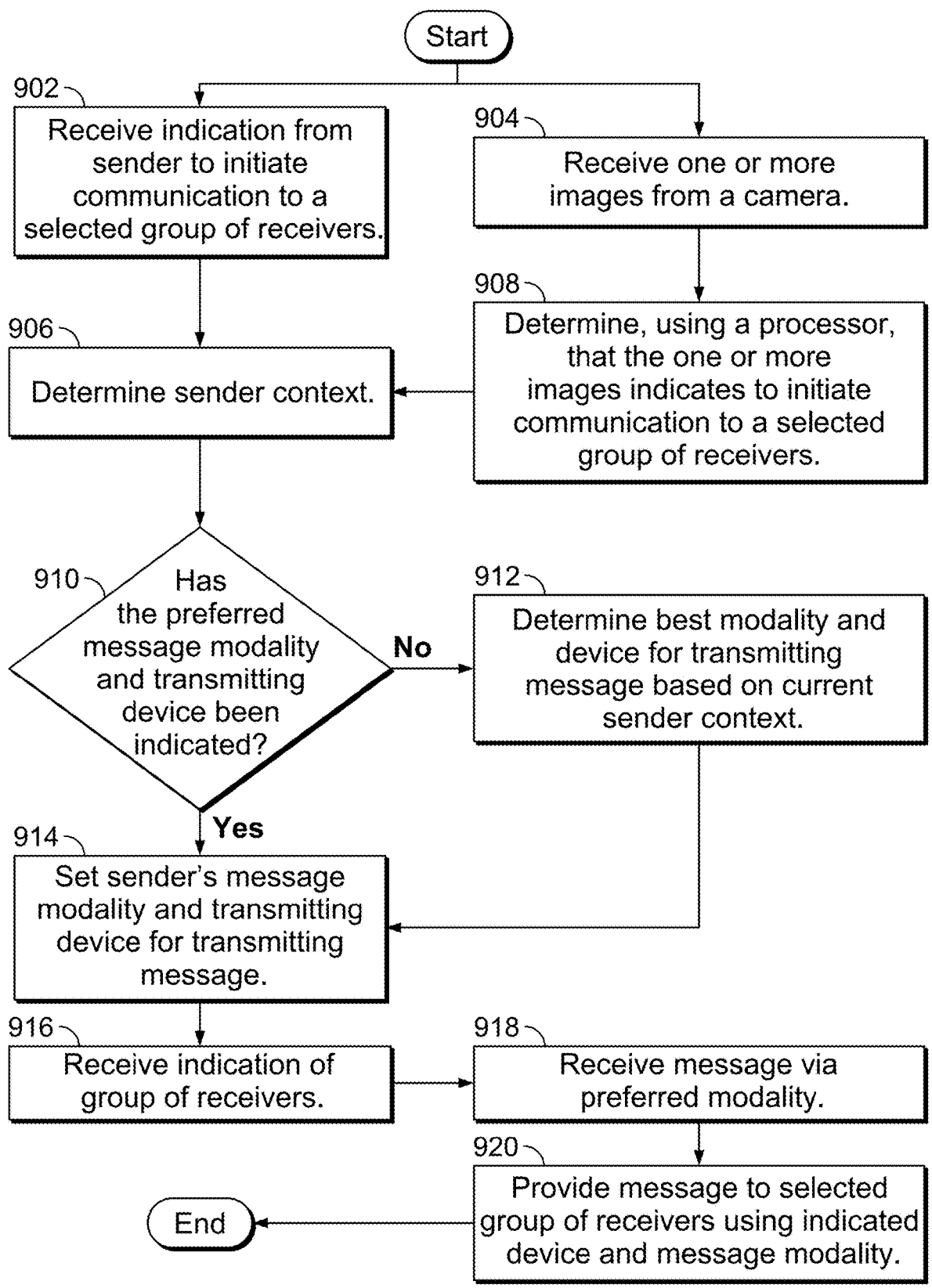
FIG. 9 is a flow diagram illustrating an embodiment of a sending a message using a flexible interface driver communication system.

FIG. 9 is a flow diagram illustrating an embodiment of a sending a message using a flexible interface driver communication system. In some embodiments, the process of FIG. 9 is executed by the flexible interface driver communication system of FIG. 2. In the example shown in 904, one or more images of an interior of a vehicle from a camera is received. For example, a driver interacts with the flexible interface driver communication system using gestures that are detected by a vehicle event recorder (VER) to select previously assigned communication channels or to initiate communication of a message. These gestures are captured by an interior-facing camera on the VER and recognized by a computer algorithm. In some embodiments, driver gestures are detected by other communication devices comprising cameras such as a mobile phone or tablet. In 908, it is determined that the one or more images indicates to initiate communication to a selected group of receivers from a driver determined using a processor, and control passes to 906. For example, to switch channels while paying attention to the road, the driver makes the ASL sign for the number 'two' and the system responds with the audio confirmation "Channel 2 selected, nearby drivers". In 902, an indication from sender to initiate communication to a selected group of receivers is received, and control passes to 906. For example, the sender uses their mobile device to select the nearby driver group. In some embodiments, the nearby driver group is determined by 418 of FIG. 4. In 906, the sender's context is determined. For example, the sender is a driver driving or the sender is a dispatcher in a noisy office environment.

In 910, it is determined whether the preferred message modality and transmitting device has been indicated. In response to determining that the preferred message modality and the transmitting device has not been indicated, control passes to 912. In 912, the best modality and device for transmitting message to receiver is determined based on current sender context, and control passes to 914. In response to determining that the preferred message modality and transmitting device has been indicated, control passes to 914. In 914, the sender's message modality and transmitting device(s) is set for transmitting the message.

In 916, a group of receivers for receiving the sender's message is indicated. For example, the sender is a dispatcher and the receivers are a group of drivers traveling along the same road. In 918, the message is received by the system via the preferred modality of the sender. For example, the sender is in a noisy environment and the sender uses text to send the message. In 920, the message to selected group of receivers using indicated device and message modality is provided. For example, of the group of drivers traveling along the same road, one driver is out of the vehicle and receives the message via a text while the other drivers are driving and receive the message via audio from the VER. In some embodiments, it is necessary to determine the appropriate device to use to reach the driver. For example, if the location of the driver and the location of the vehicle are the same, then route the message to the vehicle's device—for example, the VER. If the driver is more than a set distance away from the vehicle, then route the message to the mobile device of the driver. In some embodiments, an appropriate device is determined to reach the driver/receiver in the group of receivers—for example, a first location is determined for the driver, a second location is determined for the vehicle, it is determined whether the first location and the second location are close to each other (e.g., within a threshold distance) or not, in response to the first location and the second location not being close to each other, indicating a mobile device of the driver; and in response to the first location and the second location being close to each other, indicating a device associated with the vehicle associated with the driver.

Figure 10:
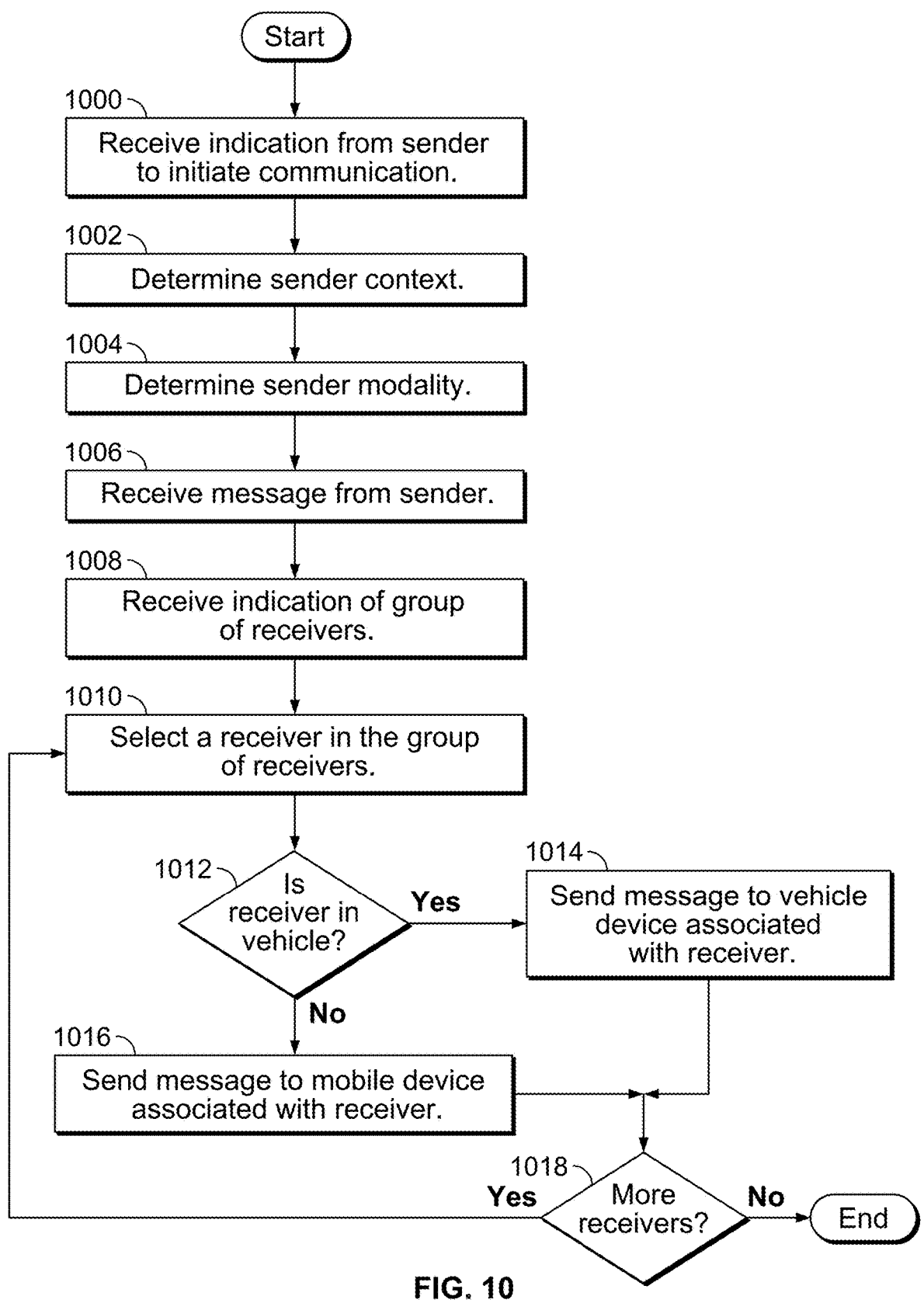
FIG. 10 is a flow diagram illustrating an embodiment of a process for sending a message.

FIG. 10 is a flow diagram illustrating an embodiment of a process for sending a message. In some embodiments, sender initiating the flow of FIG. 10 uses dispatch system 106 of FIG. 1. In the example shown, in 1000 an indication is received from a sender to initiate communication. For example, a dispatcher or other sender indicates to communicate with one or more drivers in an emergency situation, privately, as part of a work group, in response to an accident, or any other appropriate scenario. In 1002, the sender context is determined. For example, it is determined what the device type (e.g., desktop, laptop, mobile device, device with microphone, device with keyboard, etc.) the sender is using, what the sender environment is (e.g., noisy environment, private environment, public environment, etc.), where the sender is (e.g., in an office, in a vehicle, etc.), etc. In some embodiments, the sender context is automatically determined and adjusted for (e.g., in the event that a noisy environment is determined for the sender, a text mode context is determined instead of audio messaging). In 1004, a sender modality is determined. For example, the communication modality is determined (e.g., is the communication modality audio, text, video, visual, etc.). In 1006, a message is received from the sender. For example, an audio, a text, a video, or a visual message is received from the dispatcher. In 1008, an indication is received of a group of receivers. For example, a group of receivers is received such as a specific driver, a set of drivers, all drivers, a work group, etc. In 1010, a receiver is selected in the group of receivers. In 1012, it is determined whether the receiver is in the vehicle. For example, it is determined whether the location of the receiver (e.g., a driver) is the same as the location of the vehicle associated with the receiver. In some embodiments, the location of the vehicle is determined by the communications server by requesting and receiving the GPS location of the vehicle, and the location of the driver is determined by requesting and receiving the GPS location of the driver, and the difference between their locations is used to determine whether the driver is in the vehicle. In some embodiments, the interior camera of the vehicle or a seat sensor or other vehicle sensors is/are used to determine whether the driver is in the vehicle. In response to the receiver being in the vehicle, in 1014 a message is sent to vehicle device associated with the receiver, and control passes to 1018. For example, the message from the dispatcher is sent to the vehicle event recorder or other device mounted in the vehicle. In response to the receiver not being in the vehicle, in 1016 a message is sent to a mobile device associated with the receiver, and control passes to 1018. For example, the message from the dispatcher is sent to the mobile phone, tablet, or other device with a driver (e.g., as the driver is at a work site, client site, making a delivery, etc.). In 1018, it is determined whether there are more receivers. In response to there being more receivers, control passes to 1010. In response to there not being more receivers, the process ends.

Figure 11:
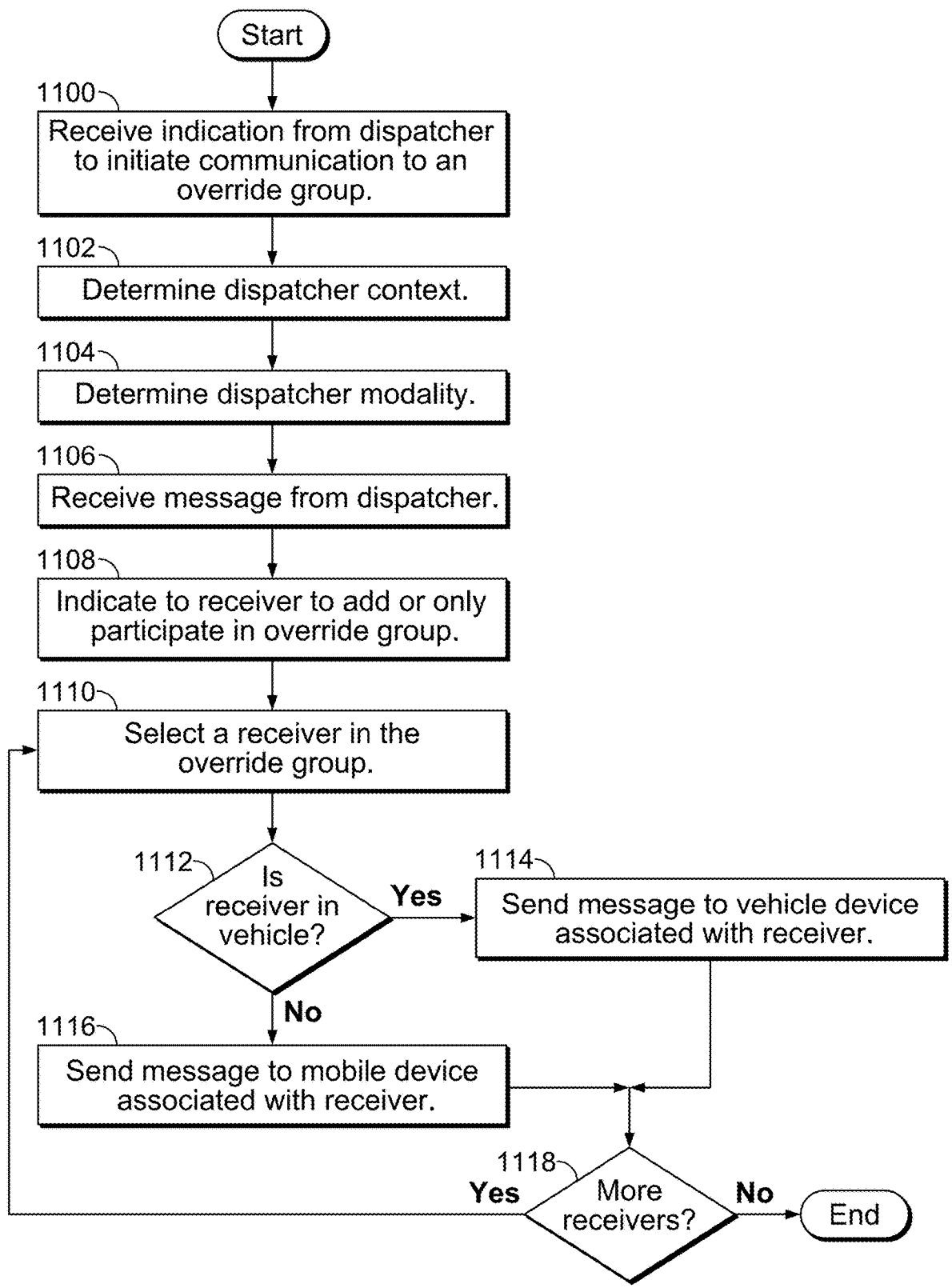
FIG. 11 is a flow diagram illustrating an embodiment of a process for sending message from a dispatcher.

FIG. 11 is a flow diagram illustrating an embodiment of a process for sending message from a dispatcher. In some embodiments, dispatcher initiating the flow of FIG. 11 uses dispatch system 106 of FIG. 1. In the example shown, in 1100 an indication is received from a dispatcher to initiate communication to an override group. For example, a dispatcher indicates to communicate with one or more drivers in an emergency situation, privately, as part of a work group, in response to an accident, or any other appropriate scenario. In 1102, the dispatcher context is determined. For example, it is determined what the device type (e.g., desktop, laptop, mobile device, device with microphone, device with keyboard, etc.) the dispatcher is using, what the dispatcher environment is (e.g., noisy environment, private environment, public environment, etc.), where the dispatcher is (e.g., in an office, in a vehicle, etc.), etc. In some embodiments, the dispatcher context is automatically determined and adjusted for (e.g., in the event that a noisy environment is determined for the dispatcher, a text mode context is determined instead of audio messaging). In 1104, a dispatcher modality is determined. For example, the communication modality is determined (e.g., is the communication modality audio, text, video, visual, etc.). In 1106, a message is received from the dispatcher. For example, an audio, a text, a video, or a visual message is received from the dispatcher. In 1008, an indication is received to add or only participate in an override group. For example, it is indicated that the receivers either add or only participate in an override group so that the receivers receive the message from the dispatcher. In some embodiments, the receivers are set to only participate in the override group and all other groups are unsubscribed for the receiver. In some embodiments, the receivers are set to add the override group to the receiver's active group list. In some embodiments, the receivers are set to make the override group the active group and the other receiver subscribed groups are pushed to background status (e.g., receiving messages but queued or sent as text or as email messages, voicemail messages, etc.). In 1110, a receiver is selected in the override group. In 1112, it is determined whether the receiver is in the vehicle. For example, it is determined whether the location of the receiver (e.g., a driver) is the same as the location of the vehicle associated with the receiver. In some embodiments, the location of the vehicle is determined by the communications server by requesting and receiving the GPS location of the vehicle, and the location of the driver is determined by requesting and receiving the GPS location of the driver, and the difference between their locations is used to determine whether the driver is in the vehicle. In some embodiments, the interior camera of the vehicle or a seat sensor or other vehicle sensors is/are used to determine whether the driver is in the vehicle. In response to the receiver being in the vehicle, in 1114 a message is sent to vehicle device associated with the receiver, and control passes to 1118. For example, the message from the dispatcher is sent to the vehicle event recorder or other device mounted in the vehicle. In response to the receiver not being in the vehicle, in 1116 a message is sent to a mobile device associated with the receiver, and control passes to 1118. For example, the message from the dispatcher is sent to the mobile phone, tablet, or other device with a driver (e.g., as the driver is at a work site, client site, making a delivery, etc.). In 1118, it is determined whether there are more receivers. In response to there being more receivers, control passes to 1110. In response to there not being more receivers, the process ends.

In some embodiments, the process of FIG. 11 is executed by a user or sender other than a dispatcher who has authority to force addition and/or participation in a group (e.g., an override group).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to:
receive one or more images of an interior of a vehicle from a camera;
a processor configured to:
determine whether the one or more images indicates to initiate communication to a selected group of receivers from a driver;
receive a message, comprising to:
receive the message;
determine receiver context, wherein the receiver context includes a first receive context or a second receiver context, wherein the first receiver context corresponds to the driver being located in the vehicle, wherein the second receiver context corresponds to the driver being located outside the vehicle;
determine that a preferred message modality and a receiving device have not been indicated; and
in response to a determination that the preferred message modality and the receiving device have not been indicated, determine the preferred modality and the receiving device for delivering the message based on the first receiver context or the second receiver context; and
provide the message to the selected group of receivers using the determined preferred modality and the determined receiving device.

2. The system of claim 1, wherein the camera comprises one or more of: a mobile phone, a tablet, an interior vehicle camera, and/or an interior vehicle event recorder.

3. The system of claim 1, wherein the one or more images includes a hand sign indicating to start communication.

4. The system of claim 1, wherein the one or more images includes a hand sign indicating the selected group of receivers for communication.

5. The system of claim 4, wherein the hand sign indicating the selected group of receivers for communication comprises a hand sign for a numerical digit.

6. The system of claim 1, wherein the one or more images includes a hand sign indicating a message to send.

7. The system of claim 1, wherein the selected group of receivers comprises the driver and a dispatcher.

8. The system of claim 1, wherein the selected group of receivers comprises the driver and a set of drivers of vehicles ahead on a road that the driver is traveling along.

9. The system of claim 1, wherein the selected group of receivers comprises the driver and a set of drivers of vehicles behind on a road that the driver is traveling along.

10. The system of claim 1, wherein the selected group of receivers comprises one or more of the driver and a set of drivers located within a radius of a current position of the driver and/or the driver and a set of drivers located within a time to reach current position by driving.

11. The system of claim 1, wherein the selected group of receivers comprises the driver, a fleet group, a team work group, and/or a friend group.

12. The system of claim 1, wherein the message comprises one of: a voice clip, a video clip, a text converted from a voice data input, or an indicated menu communication.

13. The system of claim 12, wherein the indicated menu communication comprises one communication of a selectable menu of communications.

14. The system of claim 13, wherein the indicated menu communication is selected using a voice indication.

15. The system of claim 13, wherein the indicated menu communication is selected using a sign indication.

16. The system of claim 1, wherein the processor is further configured to receive an incoming message, wherein the incoming message is received at a portable device in response to the driver being outside the vehicle.

17. The system of claim 16, wherein the incoming message is translated to text from voice to display to the driver on the portable device.

18. A method, comprising:
receiving one or more images of an interior of a vehicle from a camera;
determining, using a processor, whether the one or more images indicates to initiate communication to a selected group of receivers from a driver;
receiving a message, comprising:
  receiving the message;
  determining receiver context, wherein the receiver context includes a first receive context or a second receiver context, wherein the first receiver context corresponds to the driver being located in the vehicle, wherein the second receiver context corresponds to the driver being located outside the vehicle;
  determining that a preferred message modality and a receiving device have not been indicated; and
  in response to a determination that the preferred message modality and the receiving device have not been indicated, determining the preferred modality and the receiving device for delivering the message based on the first receiver context or the second receiver context; and
providing the message to the selected group of receivers using the determined preferred modality and the determined receiving device.

19. A computer program product embodied in a non-transitory computer readable medium and comprising computer instructions for:
receiving one or more images of an interior of a vehicle from a camera;
determining, using a processor, whether the one or more images indicates to initiate communication to a selected group of receivers from a driver;
receiving a message, comprising:
  receiving the message;
  determining receiver context, wherein the receiver context includes a first receive context or a second receiver context, wherein the first receiver context corresponds to the driver being located in the vehicle, wherein the second receiver context corresponds to the driver being located outside the vehicle;
  determining that a preferred message modality and a receiving device have not been indicated; and
  in response to a determination that the preferred message modality and the receiving device have not been indicated, determining the preferred modality and the receiving device for delivering the message based on the first receiver context or the second receiver context; and
providing the message to the selected group of receivers using the determined preferred modality and the determined receiving device.

20. A system, comprising:
an interface configured to:
  receive an indication from a sender to initiate communication to a group of receivers; and
  receive a message for the communication; and
a processor configured to:
  determine a receiver context for a receiver in the group of receivers, wherein the receiver context includes the receiver is located in the vehicle or the receiver is located outside the vehicle;
  in response to the receiver being located in the vehicle, vehicle:
    send the receiver the message via a vehicle event recorder associated with the receiver; and
  in response to the receiver being located outside the vehicle:
    send the receiver the message via a mobile device associated with the receiver.

* * * * *